(12) United States Patent
Schroeder

(10) Patent No.: US 6,598,133 B2
(45) Date of Patent: Jul. 22, 2003

(54) SUCCESSIVE TEMPLATE GENERATION USING MINIMAL RANDOM ACCESS MEMORY BANDWIDTH

(75) Inventor: Jacob Schroeder, Lyngby (DK)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 09/894,755

(22) Filed: Jun. 28, 2001

(65) Prior Publication Data

US 2003/0005240 A1 Jan. 2, 2003

(51) Int. Cl.$^7$ .................. G06F 12/00; G06F 15/177
(52) U.S. Cl. ......................... 711/156; 709/236
(58) Field of Search .......................... 711/102, 103, 711/156, 159, 162; 707/202, 203; 709/230, 236; 714/15

(56) References Cited

U.S. PATENT DOCUMENTS

| | | | | | |
|---|---|---|---|---|---|
| 5,546,392 | A | * | 8/1996 | Boal et al. | 370/458 |
| 5,819,306 | A | * | 10/1998 | Goldman et al. | 711/100 |
| 5,855,014 | A | * | 12/1998 | Smith | 707/3 |
| 2002/0136291 | A1 | * | 9/2002 | Sala et al. | 375/240 |

* cited by examiner

*Primary Examiner*—Gary Portka
(74) *Attorney, Agent, or Firm*—Pillsbury Winthrop LLP

(57) ABSTRACT

A memory template initialization system includes a first memory device to store a first memory template. The system also includes a second memory device to store a second memory template, and a dirty bit array to track changes to the second memory template. A processing unit serves to copy a portion of the first memory template into the second memory template based on contents of the dirty bit array.

13 Claims, 6 Drawing Sheets

SUCCESSIVE TEMPLATE GENERATION USING MINIMAL RANDOM ACCESS MEMORY BANDWIDTH

BACKGROUND OF THE INVENTION

1. Field of the Invention

The present invention generally relates to the initialization of memory templates. More specifically, the present invention relates to a system, method and apparatus for using minimal memory bandwidth to initialize memory templates.

2. Discussion of the Related Art

In networking applications, frames of data are sent through a network. A frame is a packet of information that may be transferred on a network, such as a computer network. Each frame typically includes a packet header and a packet payload. The packet header may contain information such as the Internet Protocol (IP) addresses of the source device and the destination device of the frame, as well as port numbers of the source and destination, physical addresses of the source and destination, the application being executed by the source and destination devices (i.e., File Transfer Protocol (FTP), HyperText Transport Protocol (HTTP), etc.), and various other setting information, for example. The packet payload may include data such as a text file or a portion thereof.

Networking applications typically transmit a large number of frames during a given time period. For example, a single networking device may be utilized by several Internet devices each having unique IP and physical addresses. The networking device may create many frames for each of the Internet devices. Each of the frames for the devices may have common elements. For example, in a situation where three computers, A, B and C all utilize the same networking device, and A and B are both HTTP servers, but C is an FTP server, the system may be initially configured to always create a frame where the application is designated as HTTP. However, if the frame is created for C, the application designation has to be changed to FTP. Accordingly, systems typically utilize a frame "template" containing default settings for a frame, for example. The template may be stored in a Read Only Memory (ROM), or in a remote section of memory, for example. When a frame is to be created and sent over the network, the networking device copies the template into a memory, such as a Random Access Memory (RAM), for example. The networking device then changes the appropriate template data. For example, if the default application source is HTTP, and if the frame is sent for C, the application source is first changed to FTP. Next, the changed template is utilized to create a frame. When the next frame is to be generated, the entire template is copied back into the RAM, and the process repeats.

However, such a process is very inefficient in situations where large amounts of frames are to be sent over the network. For example, in a situation where a template contains 256 bytes, a 10 Gigabit Ethernet device that supports up to 15 Mega-frames/second may copy over 30 Gigabits in a second from the original template into the template in the RAM. Accordingly, a large amount of the RAM's bandwidth may be utilized to copy the template into the RAM. Systems in the prior art are therefore inefficient when large amounts of unchanged template data are continually copied from the original template into the memory template.

DETAILED DESCRIPTION

An embodiment of the present invention is directed towards an initialization of frame templates in a memory. The embodiment provides an improved system, method and apparatus for using minimal memory bandwidth to initialize memory templates.

Figure 1:
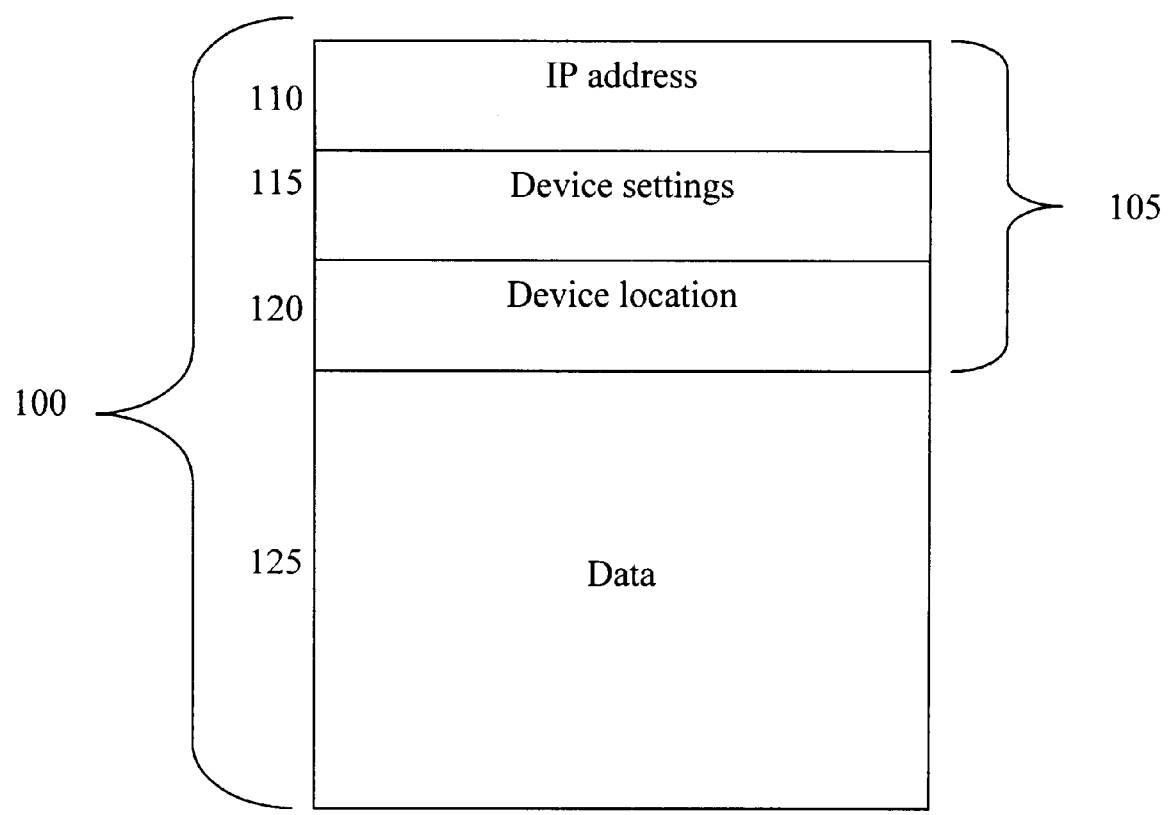
FIG. 1 illustrates a frame of data, according to an embodiment of the present invention.

FIG. 1 illustrates a frame of data, according to an embodiment of the present invention. A frame 100 is a packet of information that is transferred on a network, such as a computer network. The frame 100 includes a frame header 105 and a frame payload 125. The frame header 105 may contain source and destination information for the frame 100. The frame payload 125 may be utilized to hold file data, or a portion of file data, sent over the network. The frame header 105 may include information such as an Internet Protocol (IP) address 110 of the source and destination of the frame and settings information 115 for the source and destination devices. The settings information 115 may include information about the application being executed at the source and destination devices such as File Transfer Protocol (FTP), HyperText Transport Protocol (HTTP), etc. The frame 100 also includes location information 120 about the location of the source and destination devices. This location information 120 may contain the physical network address of the source and destination devices. A networking device may utilize the information in the frame header 105 to route the frame 100 to the correct device on the network, and ensure that the frame is properly received by that device.

Figure 2:
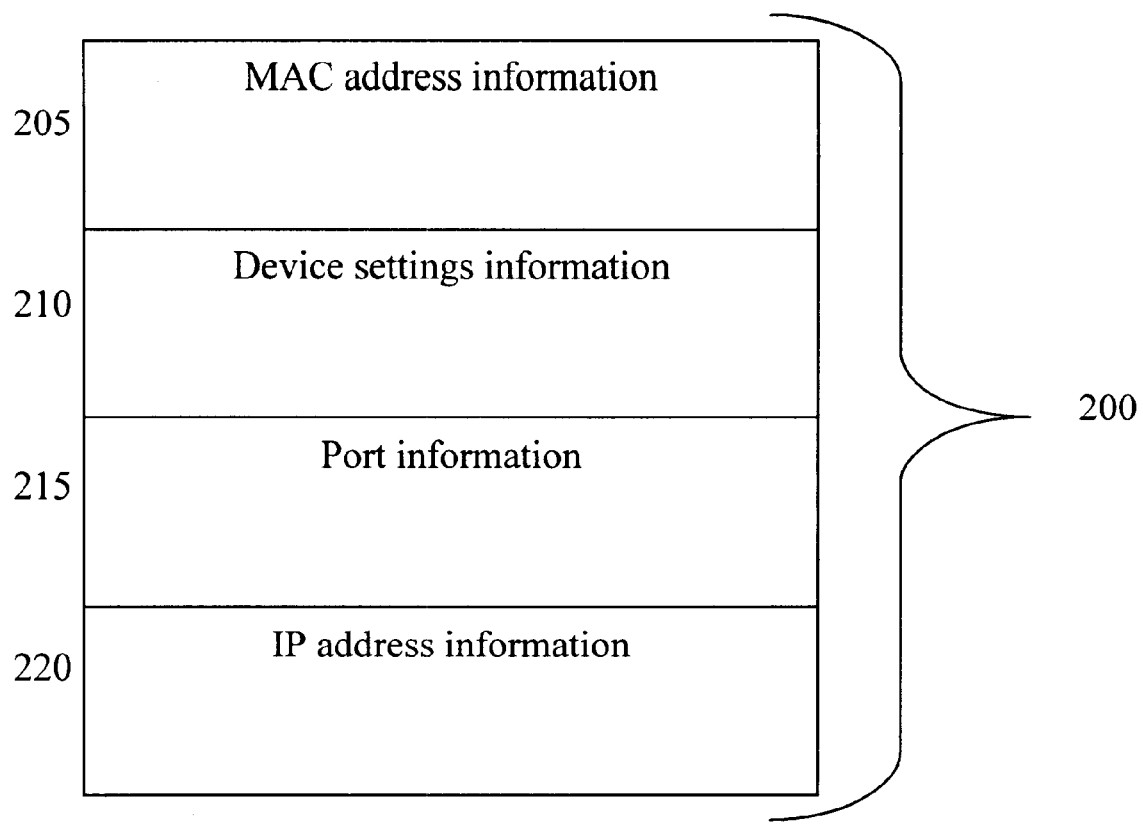
FIG. 2 illustrates a frame template according to an embodiment of the present invention.

FIG. 2 illustrates a frame template 200 according to an embodiment of the present invention. The frame template 200 may be utilized, for example, to create a frame header 105 for a frame 100 of data. The frame template 200 may be stored in a memory such as a Read Only Memory (ROM), or in any other suitable storage device. The exemplary frame template 200 shown in FIG. 2 includes Media Access Control (MAC) address information 205, for example. The frame template 200 contains device settings information 210, to hold device settings. The port information 215 may be utilized to hold information about the port utilized by a device on a network. The frame template 200 may also include IP address information 220 to hold information about an IP address of a device on the network.

Although the frame template 200 shown in FIG. 2 only holds four types of information, the frame template 200 may store more or fewer types of information in alternative embodiments. The amount of information in the frame template 200 may be application-specific or user-specific.

Figure 3:
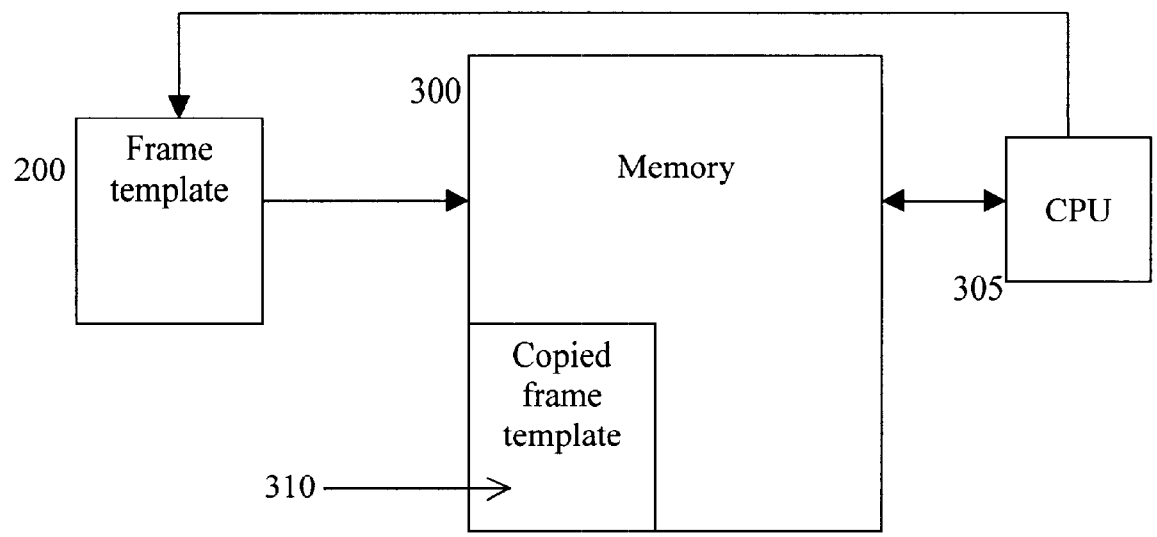
FIG. 3 illustrates a general overview of the system according to an embodiment of the present invention.

FIG. 3 illustrates a general overview of the system according to an embodiment of the present invention. The system contains a frame template 200, a memory 300, and a central processing unit (CPU) 305. The CPU 305 controls the system. The CPU 305 has a general function of creating frames 100 of data. The frames 100 of data may then be sent to a location on a network, such as a Local Area Network (LAN), a Wide Area Network (WAN), or the Internet, for example. The CPU 305 utilizes the memory 300 and the frame template 200 to create the frames 100 of data.

When the system is to create a frame 100 of data, the CPU 305 may cause the frame template 200 to create a copied frame template 310 in the memory 300. The copied frame template 310 is typically identical to the frame template 200. In an embodiment of the present invention, common frame settings such as IP address, physical network addresses, and similar settings may be stored in the frame template 200. The use of such common frame settings in a frame template 200 serves to maximize the speed in which frames 100 may be created under the control of the CPU 305.

The copied frame template 310 may then be altered. For example, if the IP address of a frame 100 to be created is different than the IP address in the frame template 200 that was copied into the copied frame template 310, then the CPU 305 changes the IP address in the copied frame template 310. After all necessary changes have been made to the copied frame template 310, the CPU 305 uses the copied frame template 310 to create the frame 100. In an embodiment of the present invention, much of the information in the copied frame template 310 may be utilized to create the frame header 105 for a frame 100 of data. The CPU 305 uses the copied frame template 310 in addition to other data, such as a file, or any other requisite data, to create the entire frame 100.

Figure 4:
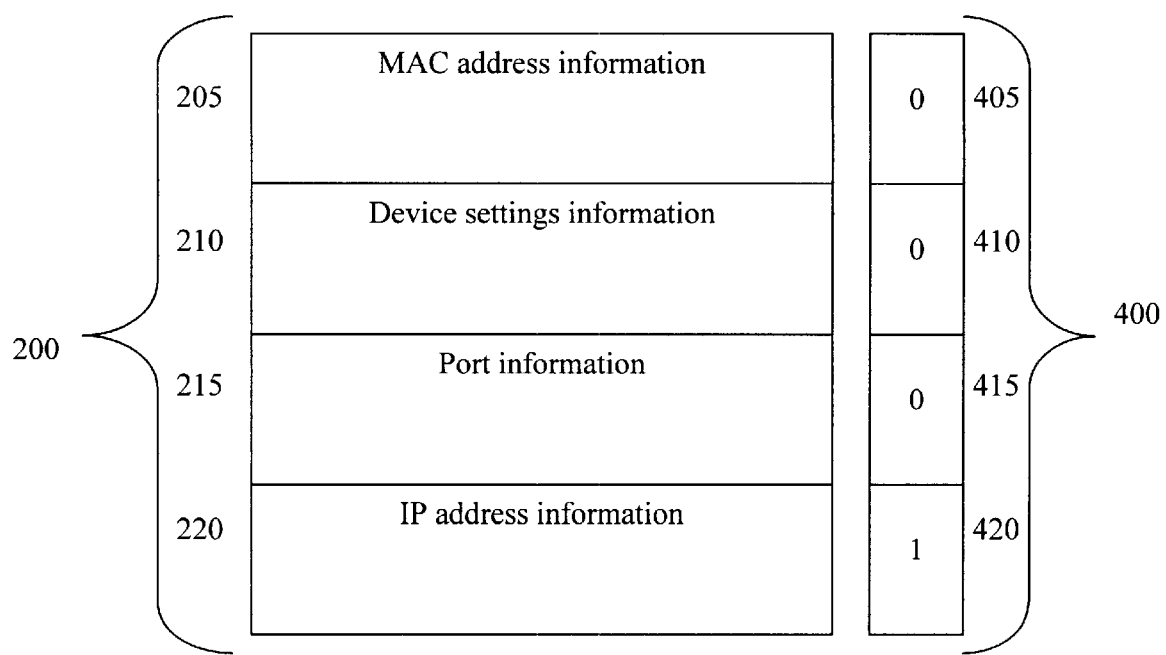
FIG. 4 illustrates a frame template and a dirty bit array according to an embodiment of the present invention.

FIG. 4 illustrates a frame template 200 and a "dirty bit array" 400 according to an embodiment of the present invention. As illustrated, the frame template 200 is comprised of the same four types of information as the frame template 200 shown in FIG. 2: a MAC address information 205, device settings information 210, port information 215, and IP address information 220. The frame template 200 has a "dirty bit array" 400 associated therewith, as discussed in further detail below. As shown, the dirty bit array 400 in the present embodiment is comprised of four bits: a first bit 405, a second bit 410, a third bit 415, and a fourth bit 420. Each bit in the dirty bit array 400 is associated with one of the items of information in the frame template 200. More specifically, the first bit 405 is associated with the MAC address information 205, the second bit 410 is associated with the device settings information 210, the third bit 415 is associated with the port information 215, and the fourth bit 420 is associated with the IP address information 220.

In embodiments having Z number of types of information stored in the frame template 200, the dirty bit array 400 may include Z bits, one for each of the items of information in the frame template 200. In additional embodiments where more than one piece of data is stored under the same information type in the frame template 200, each item of information may have more than one dirty bit associated therewith. More specifically, if two IP addresses are stored in the IP address information 220, then each IP address may be associated with its own dirty bit.

Each bit in the dirty bit array 400 is either a "1" or a "0". After a network device or computer has initially booted and copied the frame template 200 into the copied frame template 310, the system may initialize the dirty bit array 400, setting each bit to "0". When the system makes changes to the copied frame template 310, each bit in the dirty bit array 400 associated with each item of information in the copied frame template 310 that is changed is then set to "1". In other words, after the frame template 200 is initially copied into the copied frame template 310 in the memory 300, the bit associated with IP address information 220 is initially set to "0". If, before creating a frame 100, the system changes the IP address information 220 in the copied frame template 310, the system sets the bit associated with IP address information 220 to "1". In the embodiment shown in FIG. 4, the fourth bit 220 would then be set to "1". This bit is now "dirty". In other words, the information in the copied frame template 310 associated with the fourth bit 420 has been changed. After the system creates a frame 100 through the use of the copied frame template 310, the system must again initialize the copied frame template 310, to make it the same as the frame template 200. Whereas systems in the prior art copy the entire frame template 200 into the copied frame template 310 when the time came to create the next frame 100, an embodiment of the present invention copies only the data associated with bits in the dirty bit array 400 that are dirty. In other words, the dirty bit array 400 is utilized to determine which parts of the copied frame template have been changed, so the frame 100 may be correctly created. After the frame 100 has been created, the changed, or "dirty", parts of the copied frame template 310 must be "cleaned".

The dirty portions of the copied frame template 310 are cleaned by being set back to their initial values (i.e., the values identical to those in the frame template 200). More specifically, if the IP address information 220 was the only item of information in the copied frame template 310 that was changed in order to create a frame 100, then the only portion of the frame template 200 that must be copied back into the copied frame template 310 is the IP address information 220. After the IP address information 220 is copied into the copied frame template 310, the fourth bit in the dirty bit array 400 is then set to "0". Such use of dirty bits ensures that only altered data is reinitialized in the copied frame template 310. If the entire frame template had been copied back into the copied frame template 310, as is done in the prior art, then the MAC address information 205, the computer settings information 210, and the port information 215 would have all been copied from the frame template 200 back into the copied frame template 310 even though such information had not been changed.

Figure 5:
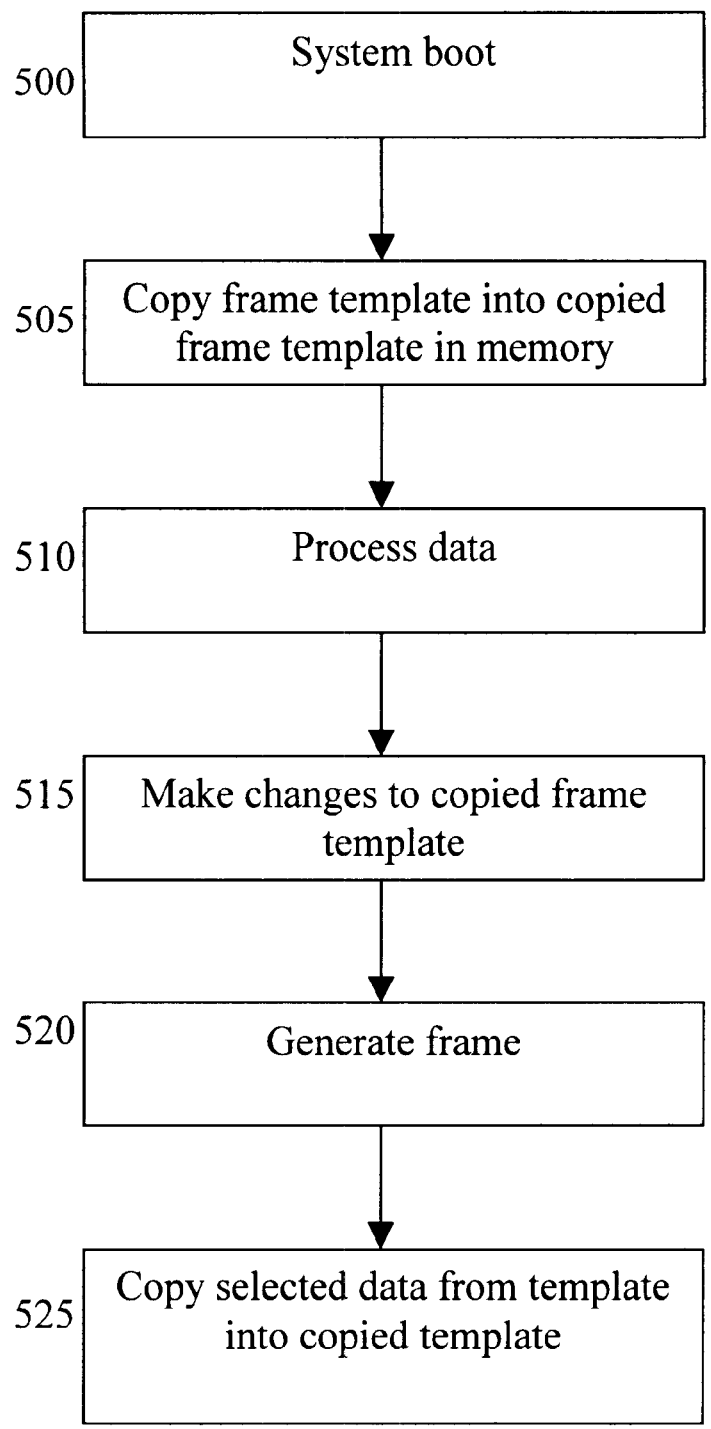
FIG. 5 illustrates how the system creates frame templates for producing frames according to an embodiment of the present invention.

FIG. 5 illustrates how the system creates frame templates 200 for producing frames 100 according to an embodiment of the present invention. First, the system using the frame template 200 to create a frame 100 is booted 500. Next, the system copies 505 the frame template 200 into the copied frame template 310 in the memory 300. The system then processes 510 the data. More specifically, the system acquires data to be added to a frame 100. This data may include a text file, or any other type of data, for example. At step 515, the system makes changes to the copied frame template 310. Then, the system generates 520 the frame. The frame 100 may be routed across the network. Finally, selected data is copied 525 from the frame template 200 back into the copied frame template 310 in the memory 300. As mentioned above, the "selected" data to be copied is determined by the dirty bit array 400. In other embodiments, the order of the steps may be different.

Figure 6:
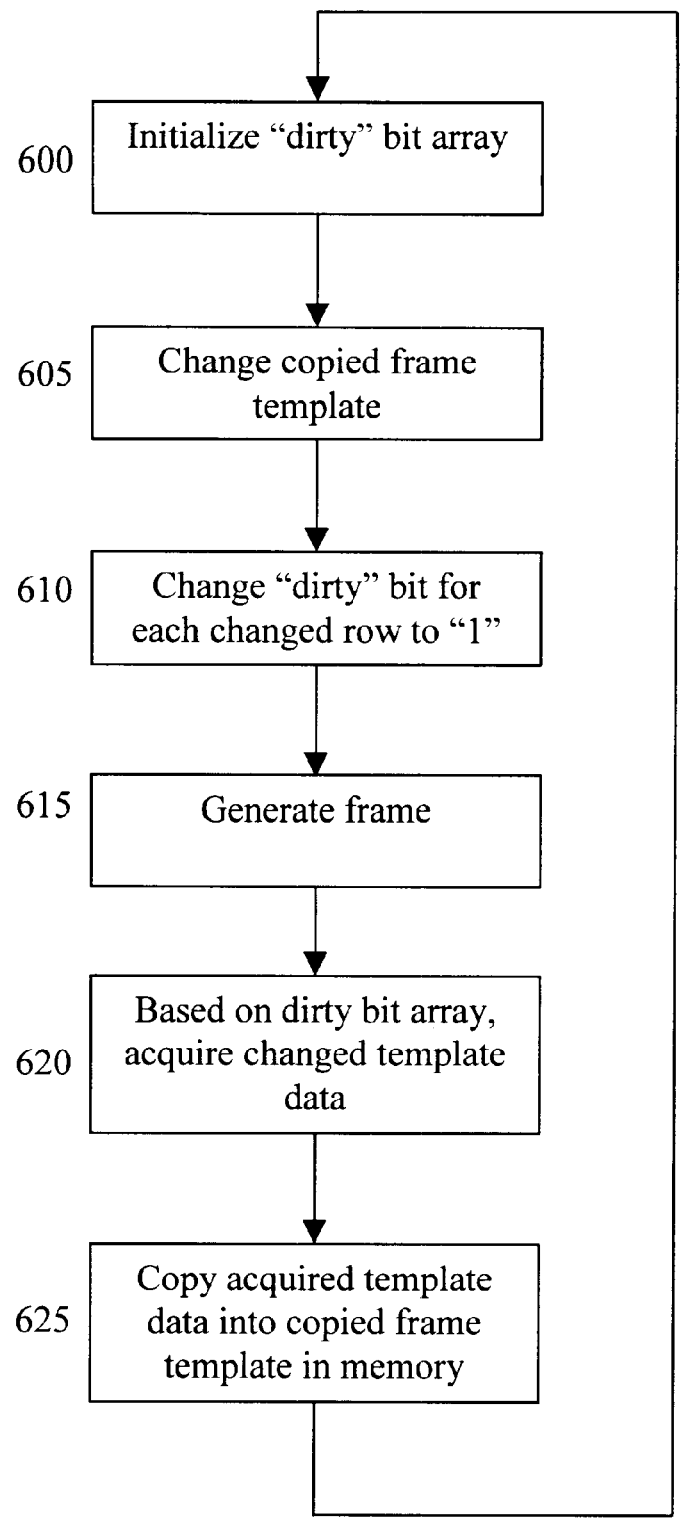
FIG. 6 illustrates how the system utilizes the dirty bit array to update the copied frame template in memory according to an embodiment of the present invention.

FIG. 6 illustrates how the system utilizes the dirty bit array 400 to update the copied frame template 310 in memory 300 according to an embodiment of the present invention. First, after the system has been booted and the frame template 200 has been copied into the copied frame template 310, the system initializes 600 the dirty bit array 400. More specifically, each bit in the dirty bit array 400 is set to "0". Next, appropriate changes 605 may be made to the copied frame template 310. As mentioned above, for each changed item of information in the copied frame template 310, the bit in the dirty bit array 400 associated therewith is set 610 to "1". Next, the system generates 615 the frame 100. Then, based on the dirty bit array 400, the system acquires 620 the changed template data from the frame template 100. More specifically, the information associated with each bit of the dirty bit array 400 that is set to "1" is then copied 625 from the frame template 200 back into the copied frame template 310. When the next frame 100 is to be created, the process repeats at step 600.

An embodiment of the present invention may be particularly useful for a networking device such as a router. Routers on a network can be configured to transmit frames 100 of data for numerous devices on a network. For example, a plurality of HTTP servers may be located on a network and may use the same router to transmit frames of data. Accordingly, each of the devices on the network may have settings common with other devices on the network. Therefore, using a memory template including many of the common settings may allow the router to more quickly create and transmit frames 100 across the network. Moreover, copying only changed portions of the frame template during the initialization on the copied frame template 310 serves to increase the amount of available RAM bandwidth for transmitting frames of data.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A memory template initialization system, comprising:

a first memory device to store a first memory template;

a second memory device to store a second memory template;

a dirty bit array to track changes to the second memory template; and a processing unit to copy a portion of the first memory template into the second memory template based on contents of the dirty bit array.

2. The system of claim 1, wherein the first memory device is a Read Only Memory (ROM).

3. The system of claim 1, wherein the second memory device is a Random Access Memory (RAM).

4. The system of claim 1, wherein each of the first memory template and the second memory template include at least one type of information.

5. The system of claim 4, wherein the dirty bit array includes a plurality of bits, and each bit corresponds to one of the at least one type of information in the second memory template.

6. A method of initializing a memory template, comprising:

accessing a first memory template;

storing a second memory template in a memory;

using a dirty bit array to track changes to the second memory template, wherein the dirty bit array includes at least one bit; and copying a portion of the first memory template into the second memory template based on contents of the dirty bit array, so that the second memory template contains the same information as the first memory template.

7. The method of claim 6, wherein the first memory template is stored in a first memory device.

8. The method of claim 6, further including storing at least one type of information in each of the first memory template and the second memory template.

9. The method of claim 8, further including using each of the at least one bit of the dirty bit array to track changes to the second memory template.

10. A memory template initialization device, comprising:

a computer-readable medium; and a computer-readable program code, stored on the computer-readable medium, having instructions to access a first memory template;

store a second memory template in a memory;

use a dirty bit array to track changes to the second memory template, wherein the dirty bit array includes at least one bit; and copy a portion of the first memory template into the second memory template based on contents of the dirty bit array, so that the second memory template contains the same information as the first memory template.

11. The memory template initialization device of claim 10, wherein the first memory template is stored in a first memory device.

12. The memory template initialization device of claim 10, wherein at least one type of information is stored in each of the first memory template and the second memory template.

13. The memory template initialization device of claim 10, wherein each of the at least one bit of the dirty bit array is utilized to track changes to the second memory template.

* * * * *